Nov. 3, 1964     C. M. WESTBROOK     3,154,941
TORSION METER

Filed March 6, 1961                                    2 Sheets—Sheet 1

INVENTOR.
CARL M. WESTBROOK
BY
ATTORNEYS

Nov. 3, 1964 C. M. WESTBROOK 3,154,941
TORSION METER

Filed March 6, 1961 2 Sheets-Sheet 2

INVENTOR.
CARL M. WESTBROOK
BY
ATTORNEYS

United States Patent Office 3,154,941
Patented Nov. 3, 1964

3,154,941
TORSION METER
Carl M. Westbrook, Beloit, Wis., assignor to Beloit Iron Works, Beloit, Wis., a corporation of Wisconsin
Filed Mar. 6, 1961, Ser. No. 93,580
4 Claims. (Cl. 73—136)

This invention relates to measuring devices and, more particularly, to an apparatus for measuring the amount by which one portion of a body is twisted relative to another portion.

When a shaft or any other structural body is acted on by two or more sets of opposing couples it suffers a twist and every section of the shaft or body between the couples is subjected to a twisting moment, or torque. Since the amount of twist suffered by the shaft is related to the magnitude of the couples, it is apparent that if the angle of this twist is measured and certain other physical properties of the shaft are known, such as its modulus of elasticity, its diameter, and the distance over which the twist is being measured, then the amount of torque on the shaft can be calculated. Further, since the torque on the shaft is related to the amount of power being delivered by it, horsepower can also be calculated when the torque and the speed of the shaft are known.

Accordingly, it is an object of this invention to provide an apparatus for measuring the amount of twist suffered by a structural body such as a shaft, the amount of torque acting on the body, and the amount of power being delivered by it in accordance with these principles.

It is another object of this invention to provide an apparatus for measuring the twist of a body which does not in any way change the polar moment of inertia of any section of the body.

It is another object of this invention to provide a twist and torque measuring apparatus which can be installed on any portion of the shaft without cutting into it.

It is still another object of this invention to provide a twist and torque measuring apparatus which can be easily set for a desired degree of sensitivity.

These and other objects, features and advantages of the present invention will be fully apparent from the following detailed description taken in conjunction with the accompanying figures of the drawings, in which.

As shown on the drawings.

Figure 1:
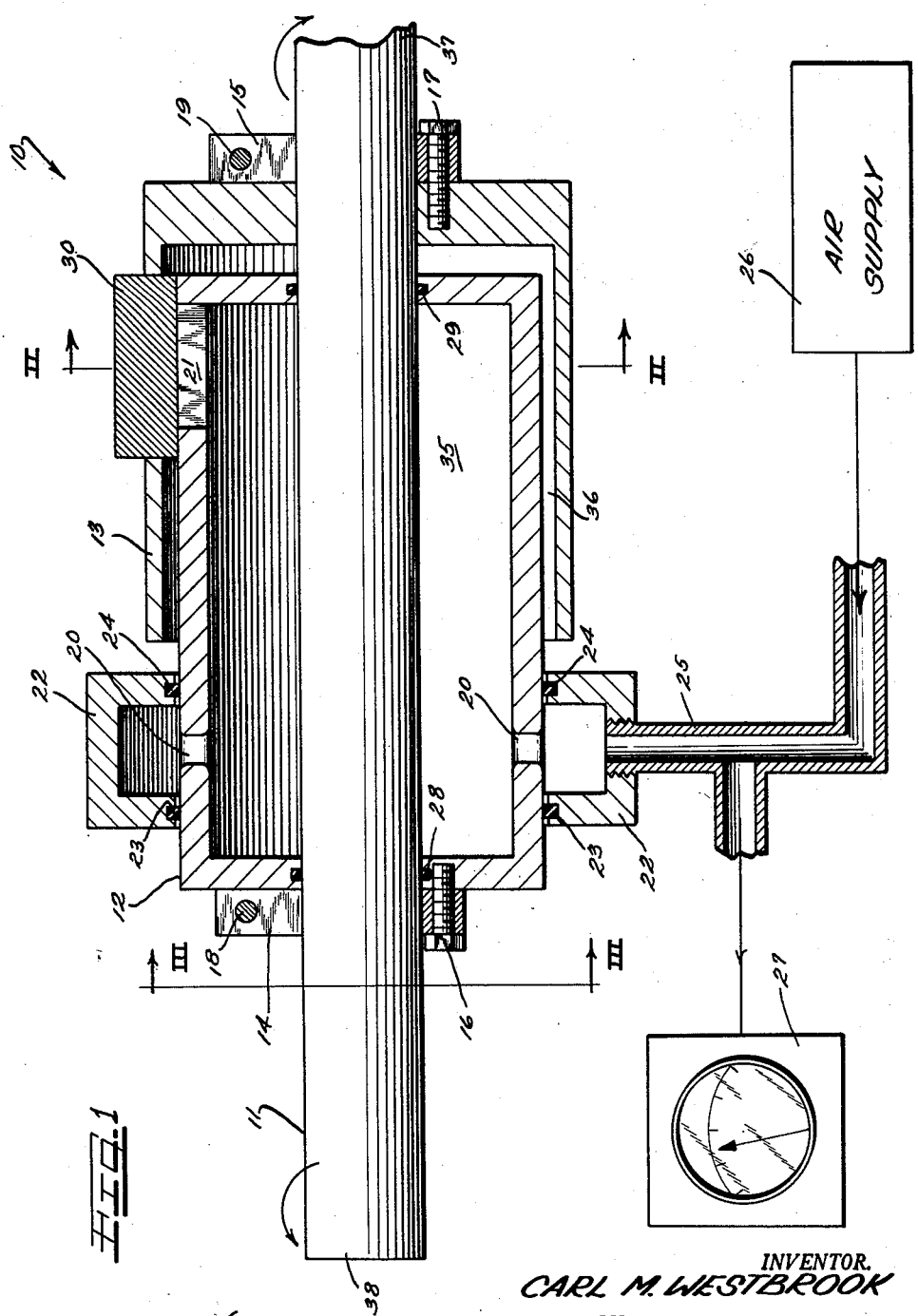
FIGURE 1 is a sectional view of an apparatus for measuring the twist and the amount of torque on a shaft in accordance with this invention.
Figure 2:
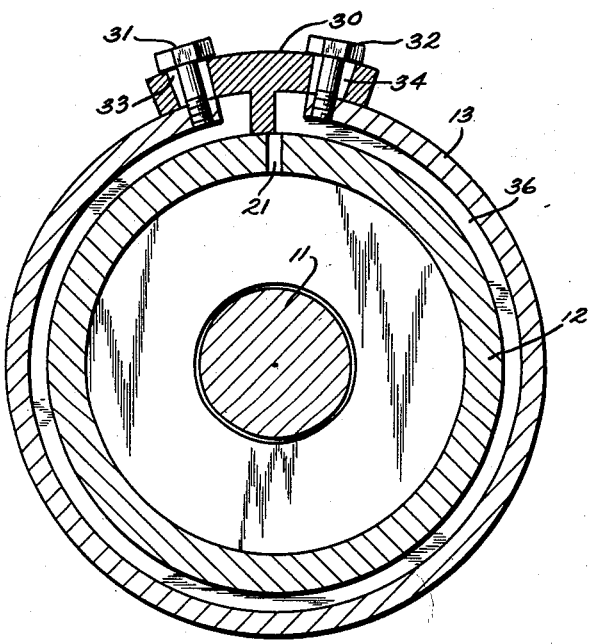
FIGURE 2 is a sectional view taken along the line 2—2 of FIGURE 1.

With specific reference to FIGURES 1 and 2, the apparatus 10 for measuring the twist of a shaft 11 includes an inner housing 12 and an outer housing 13, the two housings 12 and 13 being fastened to different points on the shaft 11. The housings 12 and 13 are fastened down by two clamps 14 and 15, respectively, which fit around the shaft 11. Two bolts 16 and 17 fasten the clamps to the housings and two other bolts 18 and 19 tighten the clamps around the shaft. Obviously, other means could be provided to fasten the housings to the shaft.

The inner housing 12 has a plurality of peripheral inlet openings 20 and an outlet orifice 21 formed in it. The inlet openings 20 are covered by a non-rotating housing 22. The clearance between the housings 12 and 22 is made small and two circular sliding seals 23 and 24 prevent air from escaping through this clearance. In operation, a conduit 25 couples the non-rotating housing 22 to an air supply 26 and a metering device 27.

Two seals 28 and 29 are provided which make the coupling between the inner housing 12 and the shaft 11 substantially airtight. Both seals are positioned in circular grooves formed in the housing 12, and the seal 29 has a relatively loose fit so that the shaft 11 can turn slightly at this end relative to the inner housing 12.

The outlet orifice 21 is an elongated slot and is positioned beneath a shoe 30 that is mounted on the outer housing 13. As shown in FIGURE 2, the shoe 30 is fastened to the housing 13 by two bolts 31 and 32, and its position relative to the orifice 21 and the outer housing 13 is adjustable because of two elongated openings 33 and 34 formed in the shoe through which the bolts 31 and 32 extend. The position of the shoe is adjusted by loosening the bolts 31 and 32 and moving the shoe along an arcuate path through a range that is determined by the length of the slots 33 and 34.

When the amount by which the shaft 11 is twisted when a torque is applied to it is to be determined, the apparatus including the inner housing 12, the outer housing 13, and the non-rotating housing 22 are slipped over the end of the shaft, these members being designed to receive this size shaft. The positions of the inner and outer housing 12 and 13 relative to each other are chosen so that the shoe 30 partially covers the orifice 21 as shown in FIGURE 2. The conduit 25 is then fastened to the non-rotating housing 22, to the metering device 27, and to the air supply 26, which is a predetermined or constant delivery type supply (e.g. comprising a supply orifice with means for maintaining a constant back pressure whereby there is a predetermined flow of air into the chamber 35).

When this supply is turned on, air passes through the conduit 25, the non-rotating housing 22 and enters the chamber 35 formed by the inner housing 12 through the openings 20. Since the orifice 21 is only partially covered by the shoe 30 the air leaves this chamber 35 through the orifice and flows out of the apparatus through the clearance 36 between the inner and outer housings 12 and 13. The amount of air flowing through the orifice 21 is restricted, however, by the shoe 30 so that a back pressure builds up in the chamber 35 and the conduit 25. This back pressure is measured by the meter 27 and is taken as being indicative of the position of the shoe 30 relative to the orifice 21.

Figure 3:
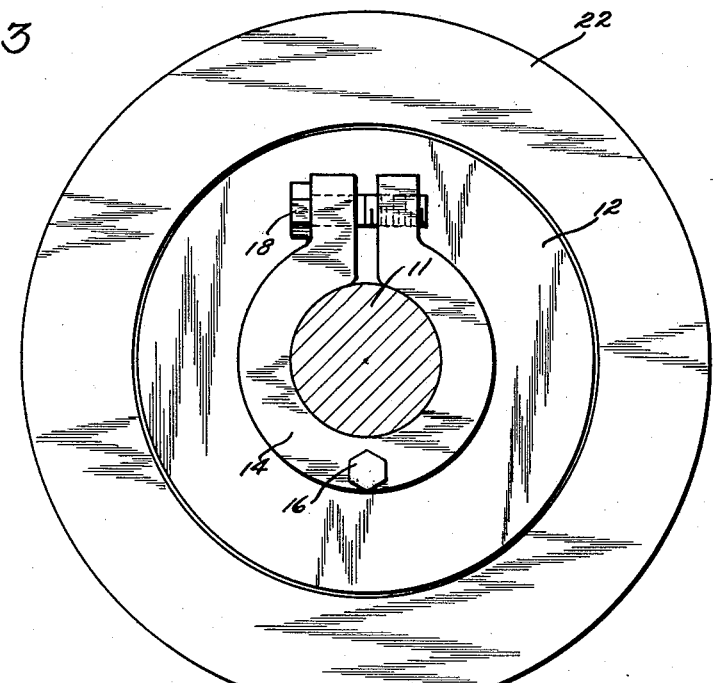
FIGURE 3 is a sectional view taken along the line 3—3 of FIGURE 1.

If the right hand end 37 of the shaft 11 is held stationary and a source of rotary power (not shown) is fastened to the left hand end 38 in such a manner as to turn this end 38 in a counter-clockwise direction as seen in FIGURE 3, the outer housing 13 and the shoe 30 will be held stationary while the inner housing 12 and the orifice 21 are turned slightly in a counter-clockwise direction. The two seals 23 and 24 permit this relative movement of the two housings 12 and 22, and a slight clearance between the shoe 30 and the periphery of the housing 12 permits these two members to move relative to each other. As previously stated, the seal 29 between the shaft 11 and the inner housing 12 permit relative movement between the end 37 of the shaft and the inner housing.

As the inner housing 12 rotates slightly in the counterclockwise direction, a greater portion of the orifice 21 is covered by the shoe 30 with the result that the flow of air out of the chamber 35 is increasingly restricted. This action causes the pressure within the conduit 25 to build up slightly and this pressure buildup is measured by the pressure responsive metering device 27 which can be calibrated to read degree of twist.

If a drive having sufficient rotary power is fastened to the end 38 and a rotary load is fastened to the end 37, the shaft 11 will be rotated and the inner and outer housings 12 and 13 will be carried with it. However, due to the load on the end 37, the shaft 11 will again experience a twist and, even though the two housings 12 and 13 are rotating relative to the stationary housing 22, the two housings 12 and 13 will be angularly offset relative to each other. The amount of air leaving the chamber 35 through the orifice 21 will again be increasingly restricted as the load increases and the back pressure builds up and the device 27 indicates the pressure and twist.

Once the angle of twist is known the torque and the power being delivered by a rotating shaft can also be determined. The torque on a shaft can be calculated from the equation:

$$a = \frac{32LT}{\pi D^4 G} \qquad (1)$$

where:

$a$ is the angular deflection,
L is the length of the shaft in inches between the clamps 14 and 15,
T is the torque in the shaft in inch-pounds,
D is the diameter of the shaft in inches, and
G is the modulus of elasticity, in shear, of the shaft material.

Equations for other structural shapes are readily available.

The power being delivered can be calculated from the equation:

$$W = \frac{Tn}{5260} \qquad (2)$$

where:

W is the work in horsepower,
T is the torque in inch-pounds, and
$n$ is the shaft speed in revolutions per minute.

The metering device 27 could, of course, be calibrated to read these factors directly for a given set of conditions.

The apparatus could be modified by changing the position of the shoe 30 relative to the orifice 21 so that the effective size of the orifice 21 will be increased rather than decreased as the shaft 11 is twisted. A greater degree of sensitivity can be obtained with this apparatus by simply increasing the number of orifices and shoes. Also, the outer housing 13 need not partially enclose the inner housing 12 since the orifice 21 could be formed in an end wall of the inner housing and the outer housing 13 would only have to be large enough to support the shoe 30 adjacent the orifice. Obviously, various conventional means can be employed to fasten the inner and outer housings to the shaft 11 in place of the clamps 14 and 15 shown.

The apparatus disclosed can also be modified to measure the amount that a shaft is stretched or compressed. In this mode of operation the shoe 30 will move axially of the shaft relative to the orifice 21 and cover varying amounts of this orifice. It should be noted that the sensitivity of the apparatus can also be adjusted by the setting of the shoe relative to the orifice at zero torque. In one embodiment of this invention the length of the slot 21 is made 1 inch and the width is made .030 inch.

If power is to be measured, a meter and a speed sensing device can be used in conjunction with the apparatus disclosed, the meter being responsive to both the speed of the shaft and its twist.

It will be apparent that other modifications and variations may be effected without departing from the scope of the novel concepts of the present invention.

I claim as my invention:

1. An apparatus for measuring the twist of a shaft comprising, a first member adapted to be mounted on the shaft in a position radially outside the shaft, a second member adapted to be mounted on the shaft at a position radially outside the shaft and axially spaced from the first member, means defining a fluid outlet orifice in the first member having a passage for supplying a flow of fluid thereto, a shoe member on the second member restricting flow from said outlet orifice and changing in position relative to said outlet orifice with relative twist of the shaft for changing the resistance offered by said shoe member to flow of fluid through said outlet orifice, and means adjustably securing said shoe member on said second member accommodating adjusting the position of said shoe member in a circumferential direction relative to said first member and relative to said outlet orifice, said shoe member adjustably movable in a first direction for increasing fluid flow through said orifice and in a second direction for decreasing fluid flow through said orifice whereby the operating range of fluid flow through the outlet orifice can be selected in accordance with the expected range of twist the shaft will encounter during operation.

2. An apparatus for measuring the twist of a shaft comprising, a first member adapted to be mounted on the shaft in a position radially outside the shaft, a second member adapted to be mounted on the shaft at a position radially outside the shaft and axially spaced from the first member, means defining a fluid outlet orifice in the first member and having a passage for supplying a flow of fluid thereto with said orifice opening in a direction at an angle to the axis of the shaft, a shoe member on the second member restricting flow from said outlet orifice and changing position relative to said outlet orifice with relative twist of the shaft for changing the resistance offered by said shoe member to flow of fluid through said outlet orifice, and means adjustably securing said shoe member on said second member accommodating adjusting the position of said shoe member in a circumferential direction relative to said first member and relative to said outlet orifice, said shoe member adjustably movable in a first direction for increasing fluid flow through said orifice and in a second direction for decreasing fluid flow through said orifice whereby the operating range of fluid flow through the outlet orifice can be selected in accordance with the expected range of twist the shaft will encounter during operation.

3. An apparatus for measuring the amount of twist and the amount of torque on a section of a shaft comprising a first member which forms a chamber and is adapted to be secured to a first point on the shaft, said first member having an inlet opening and an outlet opening, an air passageway coupled to said first member adjacent said inlet opening, a second member fastened to said shaft at a second point displaced from said first point, said second member having a portion which is adapted to partially cover said outlet opening formed in said first member movable across said outlet opening in a direction laterally of air flow through the outlet opening closing a portion of the outlet opening and leaving a portion open for the free escape of air with the area of the open portion changing with twist in the shaft, and a metering device which is responsive to air pressure in said air passageway, said air passageway also being adapted to be attached to a predetermined supply of air under pressure and indicating the degree of twist between said first and second points on the shaft.

4. An apparatus for measuring the amount of twist that a shaft is subjected to comprising a first member adapted to be attached to a first point on the shaft, said first member having a chamber with an inlet opening and an outlet opening, a fluid supply passageway coupled to said first member communicating with said inlet opening, a second member adapted to be fastened to the shaft at a second point displaced from said first point, said second member having a portion that partially covers said outlet opening leaving a portion unblocked for the free passage of fluid with fluid flowing through said outlet opening escaping past said second member and the area of the outlet opening changing with twist of the shaft, said fluid passageway being adapted to be coupled to a source of fluid under pressure, and means sensing fluid pressure in said first member.

References Cited in the file of this patent

UNITED STATES PATENTS

| | | |
|---|---|---|
| 2,635,465 | White | Apr. 21, 1953 |
| 2,867,117 | Ernst | Jan. 6, 1959 |